(12) United States Patent
Nishimura et al.

(10) Patent No.: US 7,540,443 B2
(45) Date of Patent: Jun. 2, 2009

(54) MAGNETIC RECORDING/REPRODUCING APPARATUS AND TAPE THREADING METHOD THEREOF

(75) Inventors: Takumi Nishimura, Ehime (JP); Eiichi Mori, Ehime (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 64 days.

(21) Appl. No.: 11/662,731

(22) PCT Filed: Sep. 8, 2005

(86) PCT No.: PCT/JP2005/016521

§ 371 (c)(1),
(2), (4) Date: Oct. 4, 2007

(87) PCT Pub. No.: WO2006/030690

PCT Pub. Date: Mar. 23, 2006

(65) Prior Publication Data

US 2008/0164358 A1 Jul. 10, 2008

(30) Foreign Application Priority Data

Sep. 14, 2004 (JP) .............................. 2004-266261

(51) Int. Cl.
*G11B 15/66* (2006.01)
(52) U.S. Cl. .............. 242/332.4; 242/332.1; 242/532.6; 360/95
(58) Field of Classification Search .......... 242/332, 242/332.1, 332.4, 332.7, 332.8, 532.1, 532.6, 242/532.7, 582; 360/93, 95, 96.5
See application file for complete search history.

(56) References Cited

U.S. PATENT DOCUMENTS 3,185,401 A * 5/1965 Hardy ..................... 242/332.1

(Continued)

FOREIGN PATENT DOCUMENTS

JP 57-183656 11/1982

(Continued)

*Primary Examiner*—William A Rivera
(74) *Attorney, Agent, or Firm*—Kratz, Quintos & Hanson, LLP (57) ABSTRACT

It is an object of the present invention to provide a magnetic recording/reproducing apparatus and a tape threading method thereof capable of preventing cut or slip of a leader tape, and capable of effectively preventing the fixing force from being deteriorated due to variation with time. In a magnetic recording/reproducing apparatus, an end of a tape accommodated in a tape cassette 2 has a coupling element 8, and the coupling element 8 is pulled out by a tape-pulling-out element 40 and the tape is taken up around a drive reel 20. The magnetic recording/reproducing apparatus comprises a leader tape 41 having one end connected to a drive shaft 24 of the drive reel 20 and the other end connected to the tape-pulling-out element 40, a reel hub 21 which is located on an outer periphery of the drive shaft 24 and which takes up the tape around an outer peripheral surface of the reel hub 21, and a lock member 70 which connects the drive shaft 24 and the reel hub 21 with each other. The reel hub 21 includes a hub opening through which the leader tape 41 passes, and the lock member 70 is displaced by the tape-pulling-out element 40 pulled into the hub opening and connects the drive shaft 24 and the reel hub 21 with each other.

7 Claims, 11 Drawing Sheets

U.S. PATENT DOCUMENTS

| | | | |
|---|---|---|---|
| 3,606,192 A | * | 9/1971 | Goddard .................. 242/332.1 |
| 4,477,851 A | * | 10/1984 | Dalziel et al. ................. 360/95 |
| 6,398,142 B1 | * | 6/2002 | Kletzl et al. ............. 242/332.4 |
| 6,540,167 B2 | * | 4/2003 | Sasaki et al. ............ 242/332.4 |
| 6,719,231 B2 | * | 4/2004 | Hiraguchi ............... 242/332.8 |
| 7,134,624 B2 | * | 11/2006 | Hamming ................ 242/332.4 |
| 7,344,100 B2 | * | 3/2008 | Tsuneyoshi et al. ...... 242/332.4 |

FOREIGN PATENT DOCUMENTS

JP      2000-48438      2/2000

* cited by examiner

MAGNETIC RECORDING/REPRODUCING APPARATUS AND TAPE THREADING METHOD THEREOF

TECHNICAL FIELD

The present invention relates to a magnetic recording/reproducing apparatus which pulls out an end of a tape from a tape cassette of a single hub having one reel around which a tape is wound, and which winds the tape around a drive reel, and which carries out recording and replaying operations, and the invention also relates to a tape threading method of the magnetic recording/reproducing apparatus.

BACKGROUND TECHNIQUE

According to a conventional magnetic recording/reproducing apparatus of this kind, only a leader tape is introduced into a reel hub, a tape-pulling-out element is stopped at an opening position of the reel hub, and the tape threading is carried out. However, a load generated by tension is always applied to the leader tape not only at the time of tape threading but also when the tape threading is completed and the magnetic tape is reel up. It is proposed to dispose a spiral spring in a space between the reel hub and a drive shaft, and the reel hub and the drive shaft are connected to each other using a force of the spring (e.g., patent document 1).

[Patent Document 1]
Japanese Patent Application Laid-open No. 2000-48438 (paragraph No. (0020), FIG. 8)

According to the conventional apparatus, when the tape is reeled up only by a force of the leader tape, cut or slip of the leader tape is generated, and there is a problem that a fixing force is deteriorated due to variation with time. When a spiral spring is disposed in the space between the reel hub and the drive shaft, although a load on the leader tape can be reduced, there is a problem that the fixing force is deteriorated due to variation with time of the spring.

Hence, it is an object of the present invention to provide a magnetic recording/reproducing apparatus and a tape threading method thereof capable of preventing cut or slip of a leader tape, and capable of effectively preventing the fixing force from being deteriorated due to variation with time.

DISCLOSURE OF THE INVENTION

A first aspect of the present invention provides a magnetic recording/reproducing apparatus in which an end of a tape accommodated in a tape cassette has a coupling element, and the coupling element is pulled out by a tape-pulling-out element and the tape is taken up around a drive reel, the magnetic recording/reproducing apparatus comprising a leader tape having one end connected to a drive shaft of the drive reel and the other end connected to the tape-pulling-out element, a reel hub which is located on an outer periphery of the drive shaft and which takes up the tape around an outer peripheral surface of the reel hub, and a lock member which connects the drive shaft and the reel hub with each other, wherein the reel hub includes a hub opening through which the leader tape passes, and the lock member is displaced by the tape-pulling-out element pulled into the hub opening and connects the drive shaft and the reel hub with each other.

According to a second aspect of the invention, in the first aspect, the lock member includes a lock member rotation shaft provided on the reel hub, an element abutment portion which is turned around the lock member rotation shaft through a predetermined angle, and a biasing member which biases the element abutment portion toward the hub opening, and the element abutment portion is displaced from the hub opening toward the drive shaft by pulling the tape-pulling-out element into the hub opening.

According to a third aspect of the invention, in the second aspect, the lock member includes a lock pin, the drive shaft includes a fitting hole, and the lock pin is biased towards the drive shaft by displacing the element abutment portion and then is inserted into the fitting hole.

According to a fourth aspect of the invention, in the second aspect, a magnet member is disposed in the vicinity of the element abutment portion, and the tape-pulling-out element is attracted by the magnet member.

A fifth aspect of the invention provides a tape threading method of a magnetic recording/reproducing apparatus in which an end of a tape accommodated in a tape cassette has a coupling element, the coupling element is pulled out by a tape-pulling-out element and the tape is taken up around a drive reel, the magnetic recording/reproducing apparatus comprising a leader tape having one end connected to a drive shaft of the drive reel and the other end connected to the tape-pulling-out element, a reel hub which is located on an outer periphery of the drive shaft and which takes up the tape around an outer peripheral surface of the reel hub, and a lock member which connects the drive shaft and the reel hub with each other, wherein the reel hub includes a hub opening through which the leader tape passes, the lock member includes a lock member rotation shaft provided on the reel hub, an element abutment portion which is turned around the lock member rotation shaft through a predetermined angle, a biasing member which biases the element abutment portion toward the hub opening, and a lock pin which corresponds to a fitting hole formed in the drive shaft, the tape-pulling-out element is introduced into the hub opening by normally rotating the drive shaft, the lock pin is biased toward the drive shaft by displacing the element abutment portion by the tape-pulling-out element, and then, the lock pin is inserted into the fitting hole by reversely rotating the drive shaft.

According to a sixth aspect of the invention, in the fifth aspect, the drive shaft is reversely rotated through a rotation angle range of 90 to 120°.

According to a seventh aspect of the invention, in the fifth aspect, if it is detected that the lock pin is inserted into the fitting hole, a lock motor is driven to release a pin which prevents the reel hub from rotating and then, the drive shaft is normally rotated, thereby normally rotating the reel hub together with the drive shaft.

According to the present invention, it is possible to reliably hold a coupling element and to carry out the tape threading stably. A load on the leader tape at the time of reeling up of the magnetic tape can be eliminated, and the tape reeling up operation can be carried out stably.

BEST MODE FOR CARRYING OUT THE INVENTION

According to the magnetic recording/reproducing apparatus of the first aspect of the invention, the magnetic recording/reproducing apparatus comprises a leader tape having one end connected to a drive shaft of the drive reel and the other end connected to the tape-pulling-out element, a reel hub which is located on an outer periphery of the drive shaft and which takes up the tape around an outer peripheral surface of the reel hub, and a lock member which connects the drive shaft and the reel hub with each other, and the reel hub includes a hub opening through which the leader tape passes, and the lock member is displaced by the tape-pulling-out element pulled into the hub opening and connects the drive shaft and the reel hub with each other. With this aspect, if the tape-pulling-out element is pulled into the hub opening, the lock member functions, and the drive shaft and the reel hub are connected to each other. Therefore, no load is applied to the leader tape after the tape-pulling-out element is pulled into the hub opening. Thus, cut and slip of the leader tape can be prevented, and it is possible to effectively prevent the fixing force from being deteriorated due to variation with time.

According to the second aspect of the invention, in the magnetic recording/reproducing apparatus of the first aspect, the lock member includes a lock member rotation shaft provided on the reel hub, an element abutment portion which is turned around the lock member rotation shaft through a predetermined angle, and a biasing member which biases the element abutment portion toward the hub opening, and the element abutment portion is displaced from the hub opening toward the drive shaft by pulling the tape-pulling-out element into the hub opening. With this aspect, the fact that the tape-pulling-out element is pulled into the hub opening is detected by displacement of the element abutment portion from the hub opening toward the drive shaft. Therefore, the lock member can reliably function.

According to the third aspect of the invention, in the magnetic recording/reproducing apparatus of the second aspect, the lock member includes a lock pin, the drive shaft includes a fitting hole, and the lock pin is biased towards the drive shaft by displacing the element abutment portion and then is inserted into the fitting hole. With this aspect, since the drive shaft and the reel hub are connected to each other by inserting the lock pin into the fitting hole, the connection operation can be carried out reliably.

According to the fourth aspect of the invention, in the magnetic recording/reproducing apparatus of the second aspect, a magnet member is disposed in the vicinity of the element abutment portion, and the tape-pulling-out element is attracted by the magnet member. With this aspect, the tape-pulling-out element is inserted into the hub opening not only by using the leader tape but also by utilizing the attraction force by the magnet. Therefore, the load on the leader tape can be reduced, and it is possible to reliably guide the tape-pulling-out element to a predetermined position.

According to the tape threading method of the magnetic recording/reproducing apparatus of the fifth aspect of the invention, the magnetic recording/reproducing apparatus comprises a leader tape having one end connected to a drive shaft of the drive reel and the other end connected to the tape-pulling-out element, a reel hub which is located on an outer periphery of the drive shaft and which takes up the tape around an outer peripheral surface of the reel hub, and a lock member which connects the drive shaft and the reel hub with each other, the reel hub includes a hub opening through which the leader tape passes, the lock member includes a lock member rotation shaft provided on the reel hub, an element abutment portion which is turned around the lock member rotation shaft through a predetermined angle, a biasing member which biases the element abutment portion toward the hub opening, and a lock pin which corresponds to a fitting hole formed in the drive shaft, the tape-pulling-out element is introduced into the hub opening by normally rotating the drive shaft, the lock pin is biased toward the drive shaft by displacing the element abutment portion by the tape-pulling-out element, and then, the lock pin is inserted into the fitting hole by reversely rotating the drive shaft. With this aspect, the lock pin can reliably be inserted into the fitting hole, and the drive shaft and the reel hub can reliably be connected to each other. Therefore, no load is applied to the leader tape after the tape-pulling-out element is pulled into the hub opening. Thus, cut and slip of the leader tape can be prevented, and it is possible to effectively prevent the fixing force from being deteriorated due to variation with time.

According to the sixth aspect of the invention, in the tape threading method of the magnetic recording/reproducing apparatus of the fifth aspect, the drive shaft is reversely rotated through a rotation angle range of 90 to 120°. With this aspect, slack of the leader tape in the reel hub can be reduced. Therefore, a force applied to the tape-pulling-out element caused by slack of the leader tape can be prevented, and it is possible to avoid a case in which the tape-pulling-out element is deviated from a predetermined position by the force of the leader tape.

According to the seventh aspect of the invention, in the tape threading method of the magnetic recording/reproducing apparatus of the fifth aspect, if it is detected that the lock pin is inserted into the fitting hole, a lock motor is driven to release a pin which prevents the reel hub from rotating and then, the drive shaft is normally rotated, thereby normally rotating the reel hub together with the drive shaft. With this aspect, the restraint on the reel hub can be released after the drive shaft and the reel hub are connected to each other. Therefore, procedure can reliably be shifted to the recording and reproducing action.

A magnetic recording/reproducing apparatus of an embodiment of the present invention will be explained below.

Figure 1:
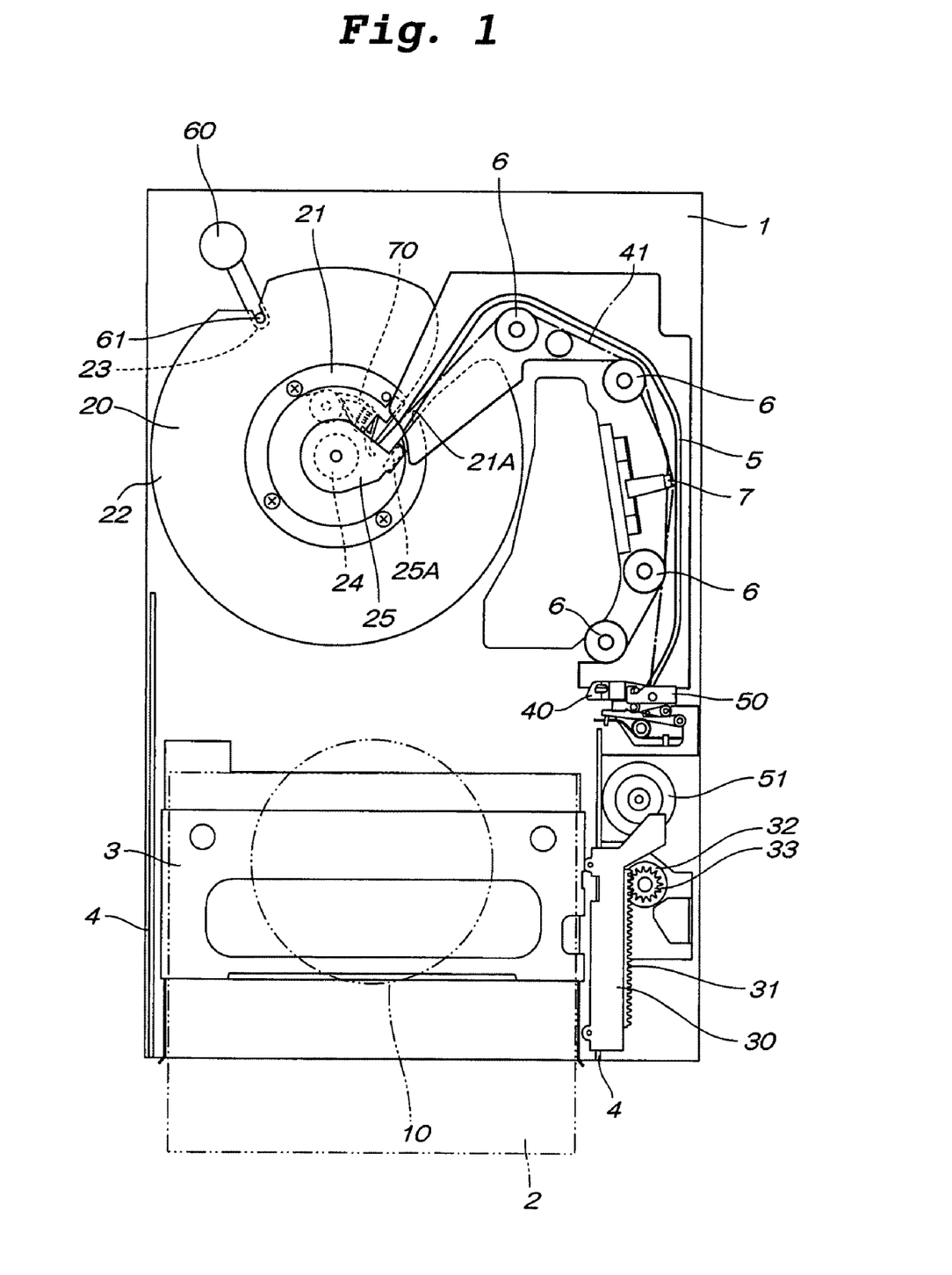
FIG. 1 is a plan view of an essential portion of a magnetic recording/reproducing apparatus according to an embodiment of the present invention.

FIG. 1 is a plan view of an essential portion of the magnetic recording/reproducing apparatus of the embodiment.

A base 1 of an apparatus main body includes a cartridge reel 10 having rotating means such as a motor, and a drive reel 20 having another rotating means. A cassette holder 3 which holds the tape cassette 2 and which moves the tape cassette 2 is provided on the side of the cartridge reel 10 of the base 1. A pair of rails 4 is disposed on the side of the cartridge reel 10 of the base 1, and the cassette holder 3 is provided such that the cassette holder 3 can slide along the pair of rails 4.

A loading lever 30 is slidably provided on one of the rails 4. The loading lever 30 is connected to the cassette holder 3, and the cassette holder 3 is operated by movement of the loading lever 30.

A rack 31 is connected to a surface of the loading lever 30 on the side of the base 1. A loading motor 32 and a gear 33 connected to the loading motor 32 are disposed on the side of the loading lever 30. The rack 31 and the gear 33 mesh with each other, and the loading lever 30 slides along the rails 4 by rotation of the loading motor 32.

A tape-pulling-out element 40 is disposed on the side of the tape cassette 2, that is, disposed in the vicinity of a door (not shown) of the tape cassette 2, when the loading operation is completed. The tape-pulling-out element 40 is held by a tape-pulling-out element moving member 50. The tape-pulling-out element moving member 50 is engaged with a groove (not shown) provided in a direction moving toward and away from a door of the tape cassette 2. A tape-pulling-out element moving motor 51 is disposed in a space between the loading motor 32 and the tape-pulling-out element 40 on the side of the loading lever 30. The tape-pulling-out element moving member 50 is connected to the tape-pulling-out element moving motor 51 through a gear mechanism (not shown).

Track grooves 5 are formed between positions in the vicinity of the tape-pulling-out element 40 and a reel hub 21 of a drive reel 20. Although only the track groove 5 on the side of the base 1 is shown in FIG. 1, another track groove having the same shape is also formed in a member (not shown) disposed at a predetermined distance from the former track groove 5, and the tape-pulling-out element 40 is guided by the pair of track grooves 5. A plurality of rollers 6 and a magnetic head 7 are disposed on the side of the track groove 5. In a state shown in the drawing, a reader tape 41 is disposed along the track groove 5. One end of the reader tape 41 is connected to the Drive reel 20, and the other end of the reader tape 41 is connected to the tape-pulling-out element 40.

The drive reel 20 includes a reel flange 22. The reel flange 22 is formed at its outer peripheral end with a flange groove 23. Although only the reel flange 22 on the side of the base 1 is shown in the drawing, a pair of reel flanges 22 is connected to both end surfaces of the reel hub 21. A hub opening 21A is formed in a portion of an outer periphery of the reel hub 21, and the reader tape 41 passes through the hub opening 21A. The tape-pulling-out element 40 is fitted into the hub opening 21A. The drive reel 20 is provided at its center with a drive shaft 24 which transmits rotation of the rotating means such as the motor. The connection of the drive shaft 24 with respect to the reel hub 21 and the reel flange 22 is released by the lock member 70 at the time of tape threading motion, and drive shaft 24 is connected to the reel hub 21 and the reel flange 22 at the time of recording and replaying operations. The reel hub 21 is provided at its end surface with a magnet holding member 25. A magnet 25A is disposed in the vicinity of the hub opening 21A in the reel hub 21 by this magnet holding member 25.

A lock motor 60 and a pin 61 which moves into the flange groove 23 by the rotation of the lock motor 60 are disposed on the side of the outer periphery of the reel flange 22 on the side of the base 1.

Next, a structure around the tape-pulling-out element moving member 50 will be explained in detail using FIG. 2.

First, the tape-pulling-out element 40 includes a first member 42 forming a recess 42A, and a second member 43 connected to the first member 42 such that the second member 43 can be displaced. The first member 42 is provided at its one end with a turning shaft 44 which turns the second member 43. The recess 42A is formed in the other end of the first member 42. Both ends of the turning shaft 44 project into the track grooves 5, so that the turning shaft 44 can slide along the track grooves 5. The second member 43 is formed with a recess 43A, and the recess 42A of the first member 42 and the recess 43A of the second member 43 form a closed space.

The tape-pulling-out element moving member 50 includes a turning shaft recess 52 with which the turning shaft 44 is engaged. The turning shaft recess 52 is continuous with an end of the track groove 5 at a predetermined position of the tape-pulling-out element moving member 50. The tape-pulling-out element moving member 50 includes a press member 53 and a support member 54. The press member 53 is provided at its one end with a press rib 53A which presses the second member 43 on the side of the turning shaft 44, and at its other end with a shaft 53B which functions as a turning fulcrum of the press rib 53A, and at its intermediate portion with a roller pin 53C. The support member 54 supports the first member 42, and prevents the tape-pulling-out element 40 from rotating when the second member 43 on the side of the turning shaft 44 is pressed by the press rib 53A. The support member 54 is provided at its lower surface with a pin, and if the pin slides in the groove, this exhibits a guide function when the tape-pulling-out element moving member 50 moves toward and away from the tape cassette 2. At a position where the tape-pulling-out element moving member 50 is most separated from the tape cassette 2, the support member 54 turns in the counterclockwise direction through a predetermined angle, thereby turning the tape-pulling-out element 40 in the counterclockwise direction. Thus, the support member 54 moves the tape-pulling-out element 40 into the groove 5 smoothly.

A guider 55 is disposed between the tape-pulling-out element moving member 50 and the loading lever 30. The guider 55 is formed with a guide surface 55A formed on its side on the side of the tape-pulling-out element moving member 50. The guide surface 55A limits movement of the roller pin 53C. The guider 55 can turn through a predetermined angle around the rotation shaft 55B. The guider 55 is biased toward the loading lever 30 by the elastic member 55D.

The loading lever 30 is provided at its end on the side of the guider 55 with a press member 34. The press member 34 presses the elastic member 55D by moving the loading lever 30 toward the tape-pulling-out element moving member 50. If the elastic member 55D is pressed by the press member 34, a free end of the guider 55 moves toward the tape-pulling-out element moving member 50.

The tape threading motion will be explained using FIGS. 1 to 8.

FIG. 1 shows a state of the tape cassette 2 before loading.

If this apparatus detects the insertion of the tape cassette 2 into the cassette holder 3, the loading motor 32 starts rotating. The rotation of the loading motor 32 is transmitted to the loading lever 30 by the gear 33 and the rack 31, and the loading lever 30 moves toward the tape-pulling-out element 40. The cassette holder 3 moves together with the loading lever 30. If the tape cassette 2 moves to a position above the cartridge reel 10, a portion of the cassette holder 3 moves the tape cassette 2 toward the base 1, and drive teeth (not shown) provided on a back surface of the tape cassette 2 are engaged with the cartridge reel 10.

By engaging the tape cassette 2 with the cartridge reel 10, the loading motion is completed. FIG. 2 shows a position of the loading lever 30 in this state. In a state where the loading of the tape cassette 2 is completed, the door of the tape cassette 2 is opened. The end of the tape accommodated in the tape cassette 2 is provided with the connection element (not shown), and this connection element is guided to a location near the door.

Figure 2:
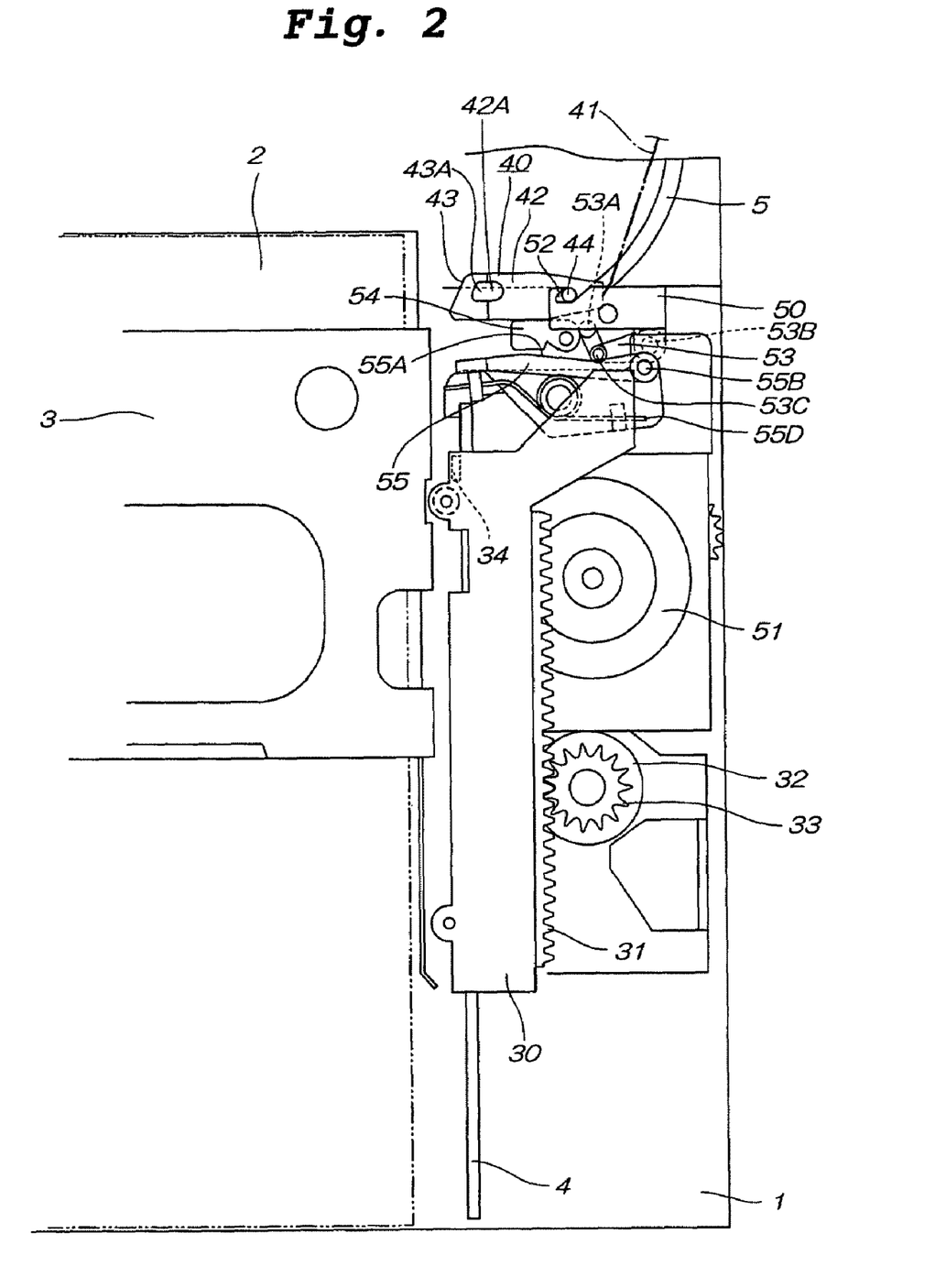
FIG. 2 is a plan view of an essential portion of the apparatus.
Figure 3:
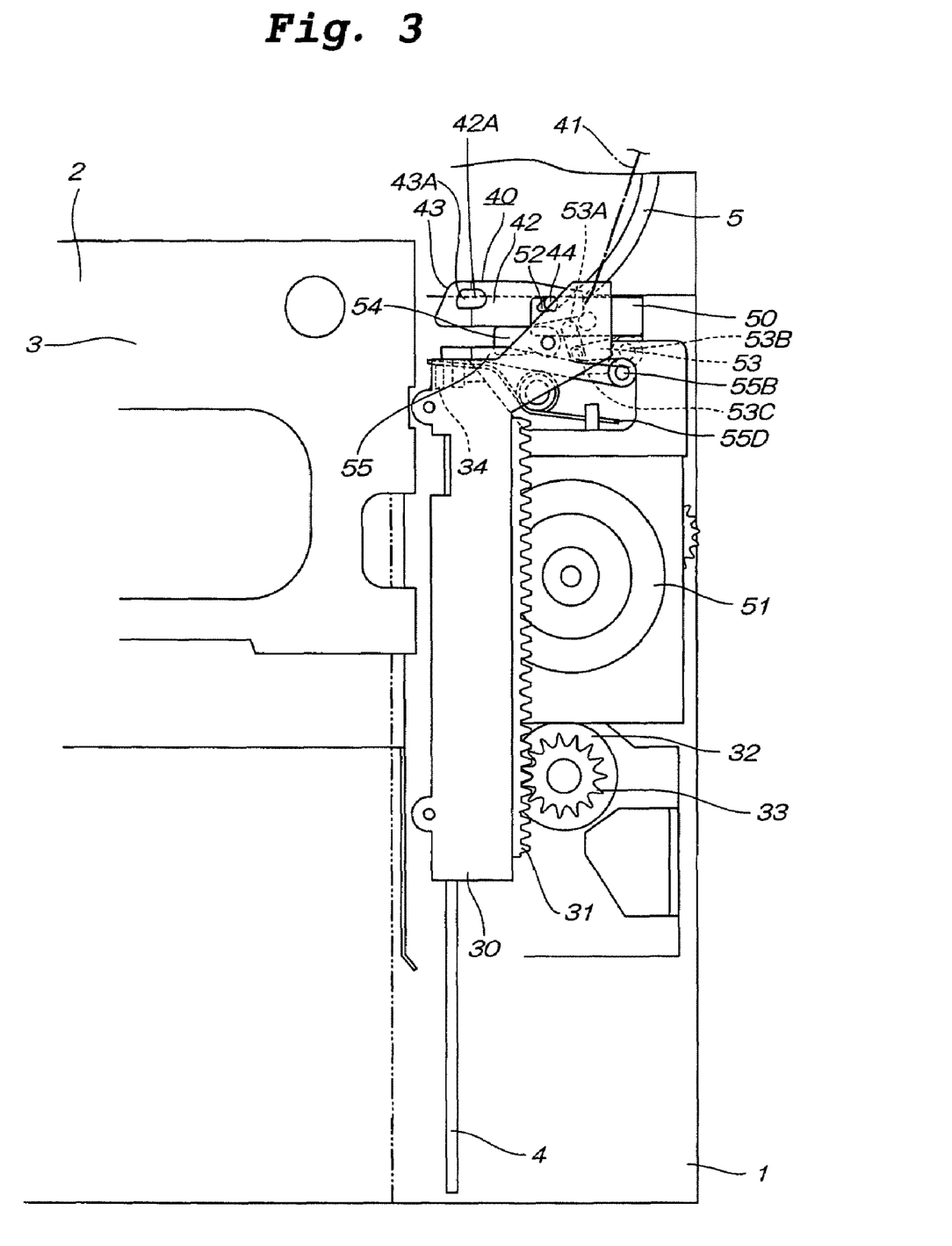
FIG. 3 is a plan view of the essential portion of the apparatus.

The loading lever 30 is moved to a location shown in FIG. 3 from the state shown in FIG. 2 which shows the state where the loading operation of the tape cassette 2 is completed. The loading motor 32 moves the loading lever 30 to the position shown in FIG. 3 and is stopped.

In the state shown in FIG. 3, the press member 34 of the loading lever 30 pushes the elastic member 55D, and a free end of the guider 55 is moved toward the tape-pulling-out element moving member 50. If the guider 55 moves, the position of the roller pin 53C is limited by the guide surface 55A.

The tape-pulling-out element moving motor 51 starts driving from the state shown in FIG. 3. If the tape-pulling-out element moving motor 51 is driven, the tape-pulling-out element moving member 50 is moved toward the tape cassette 2.

If the tape-pulling-out element moving member 50 is moved, the roller pin 53C is moved along the guide surface 55A. As the roller pin 53C approaches the tape cassette 2, the guide surface 55A approaches the tape-pulling-out element moving member 50 and thus, the roller pin 53C approaches the tape-pulling-out element moving member 50. If the roller pin 53C is displaced, the press rib 53A moves toward the tape-pulling-out element 40. The press rib 53A presses the side of the second member 43. If the press rib 53A presses the second member 43, the second member 43 turns around the turning shaft 44. The recess 43A of the second member 43 moves away from the recess 42A of the first member 42 and the recess 42A is opened.

Figure 4:
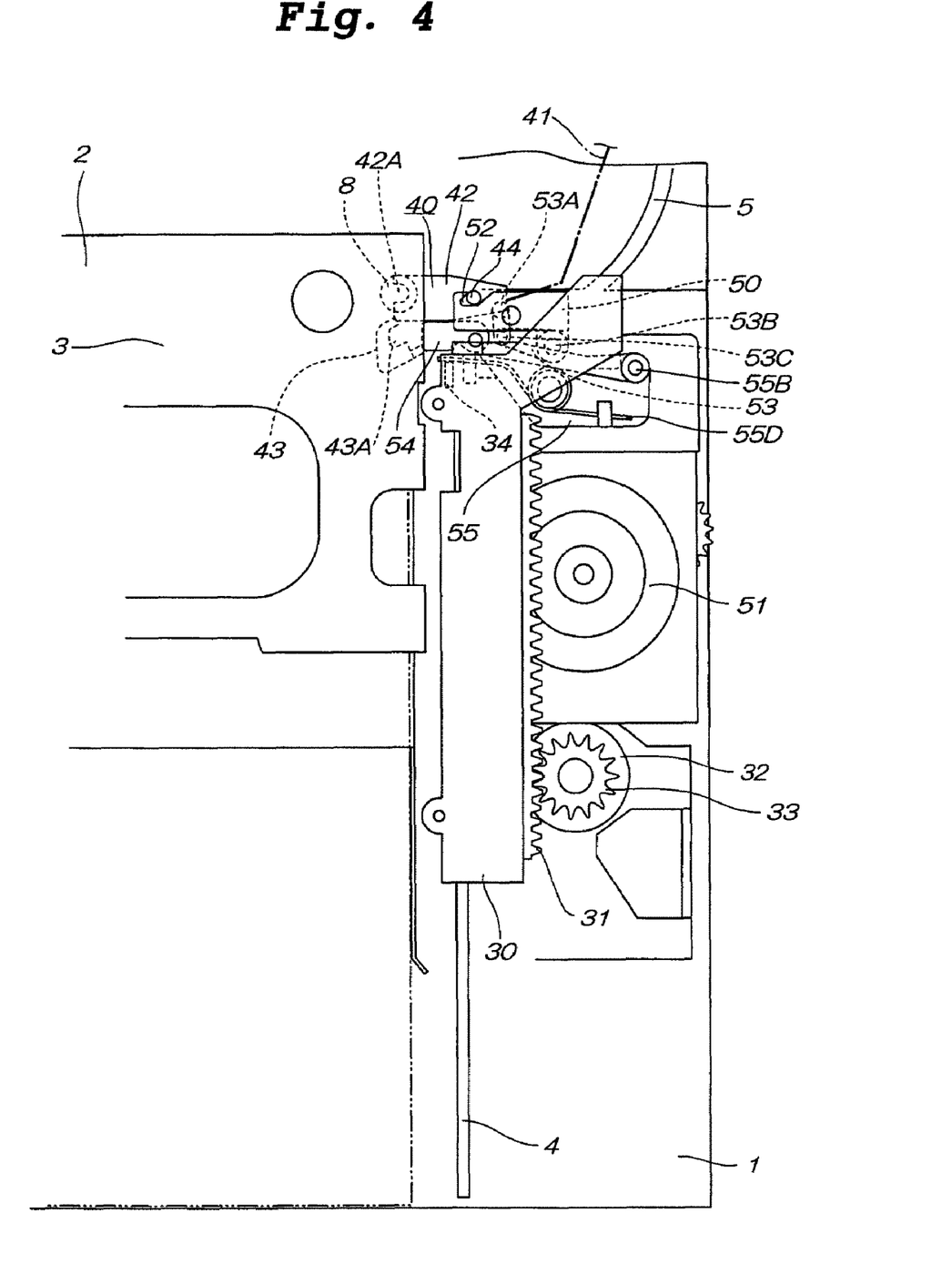
FIG. 4 is a plan view of the essential portion of the apparatus.

The tape-pulling-out element moving motor 51 moves the tape-pulling-out element moving member 50 and stops until the recess 42A of the first member 42 of the tape-pulling-out element 40 is inserted into the cassette 2. FIG. 4 shows this state.

In the state shown in FIG. 4, the recess 42A of the first member 42 is abutted against the connection element 8.

From the state shown in FIG. 4, the loading motor 32 is driven by reverse rotation, and the loading lever 30 is retreated. If the loading lever 30 is retreated, the pressing force of the press member 34 of the loading lever 30 against the guider 55 is released. Therefore, since the free end of the guider 55 moves toward the loading lever 30, the pressing force of the press rib 53A against the second member 43 is released. Since the pressing force of the press rib 53A against the second member 43 is released, the second member 43 turns around the turning shaft 44, the recess 43A of the second member 43 approaches the recess 42A of the first member 42 and the recess 42A is closed. Next, the tape-pulling-out element moving motor 51 starts driving by reverse rotation. By reversely rotating the tape-pulling-out element moving motor 51, the tape-pulling-out element moving member 50 starts moving away from the tape cassette 2.

Figure 5:
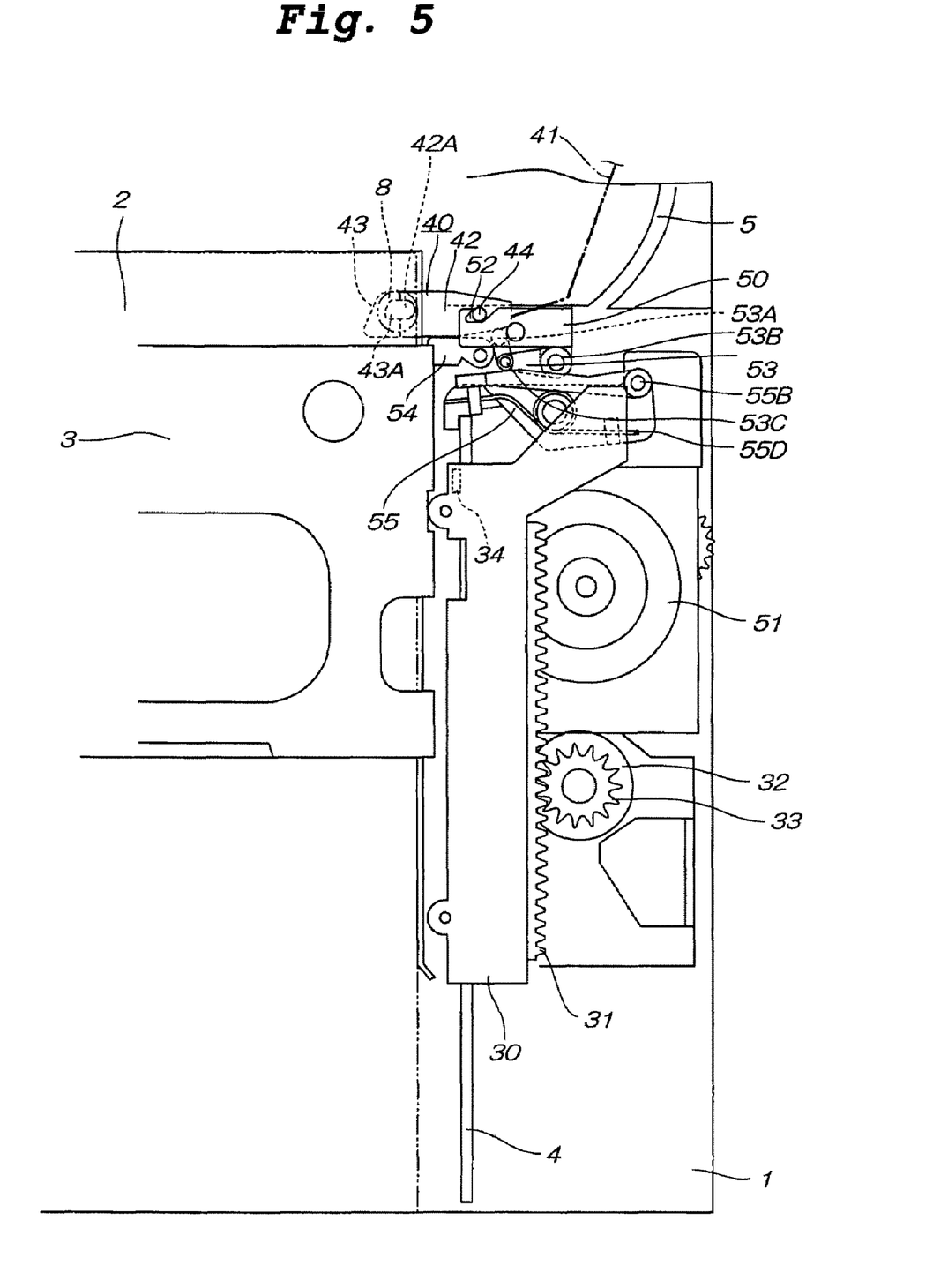
FIG. 5 is a plan view of the essential portion of the apparatus.

Therefore, the connection element 8 is disposed in a closed space formed by the recess 42A of the first member 42 and the recess 43A of the second member 43. That is, the connection element 8 is sandwiched and held between the recess 42A of the first member 42 and the recess 43A of the second member 43. FIG. 5 shows this state.

From the state shown in FIG. 5, the tape-pulling-out element moving motor 51 keeps driving by the reverse rotation. If the tape-pulling-out element moving motor 51 keeps driving by the reverse rotation, the tape-pulling-out element moving member 50 further moves away from the tape cassette 2.

Figure 6:
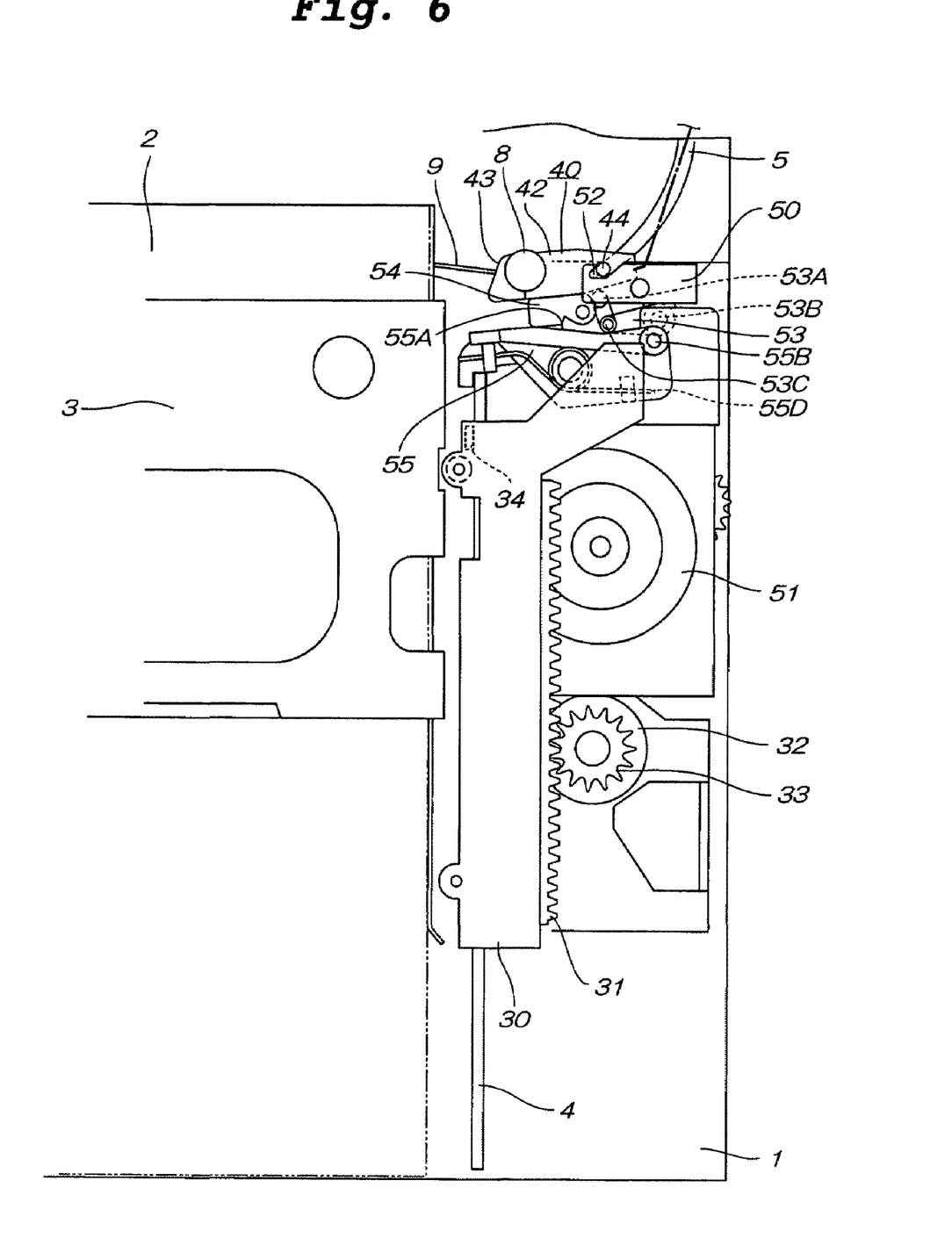
FIG. 6 is a plan view of the essential portion of the apparatus.
Figure 7:
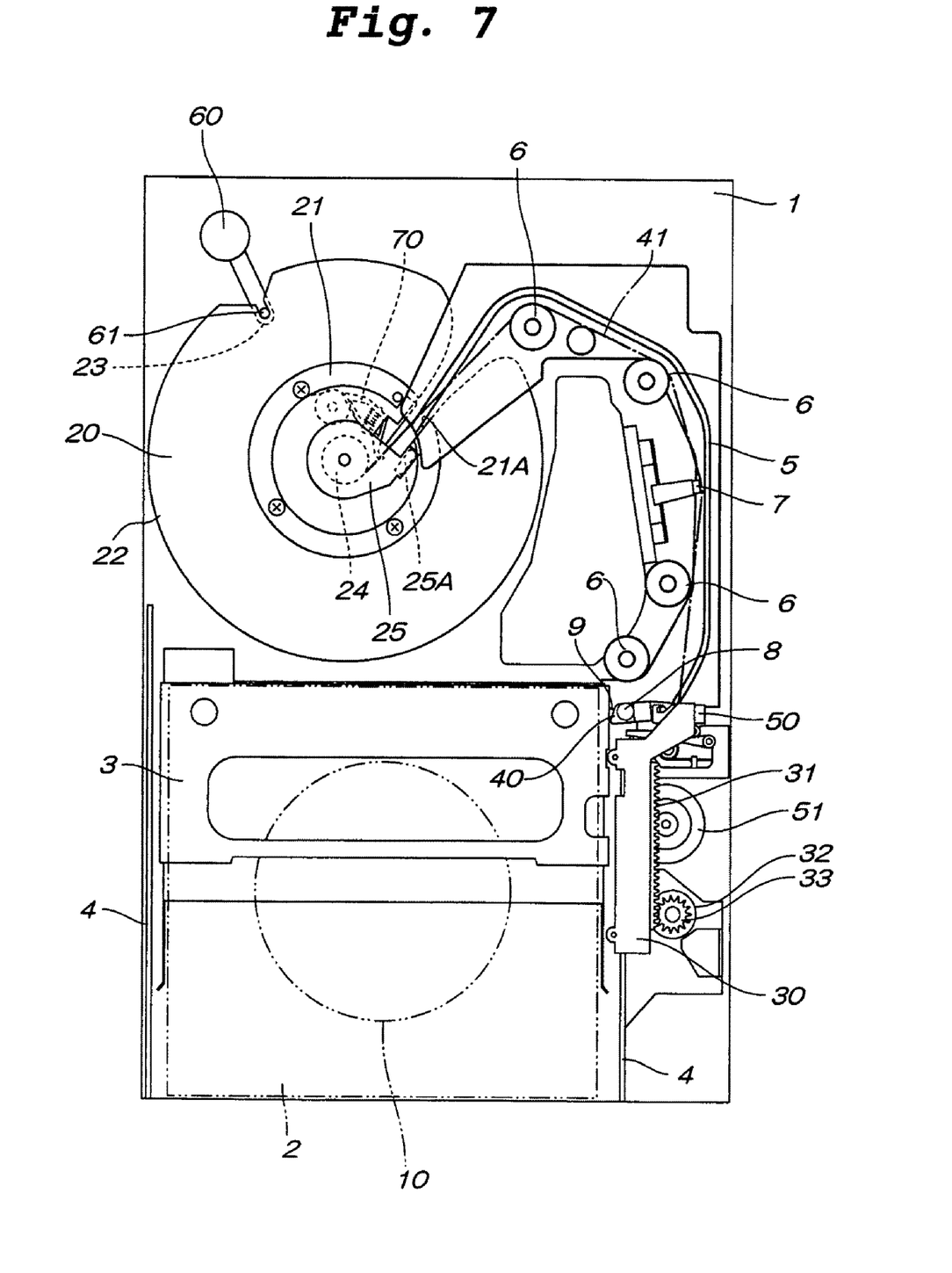
FIG. 7 is a plan view of the essential portion of the apparatus.

FIGS. 6 and 7 show a state where the movement of the tape-pulling-out element moving member 50 away from the tape cassette 2 is completed. As shown in FIG. 6, a tape 9 accommodated in the tape cassette 2 is pulled out together with the connection element 8. In a state where the movement of the tape-pulling-out element moving member 50 away from the tape cassette 2 is completed, the turning shaft recess 52 is in a position continuous with the end of the track groove 5. In this position, the support member 54 is turned in the counterclockwise direction through a predetermined angle, thereby turning the tape-pulling-out element 40 in the counterclockwise direction, and the tape-pulling-out element 40 smoothly moves toward the groove 5.

From the state shown in FIGS. 6 and 7, the tape threading motion is started.

The tape threading motion is carried out by rotating the drive reel 20. At the time of the tape threading motion, the reel hub 21 is released from a drive system of the drive reel 20, and rotation of the reel hub 21 is limited by the pin 61.

Figure 8:
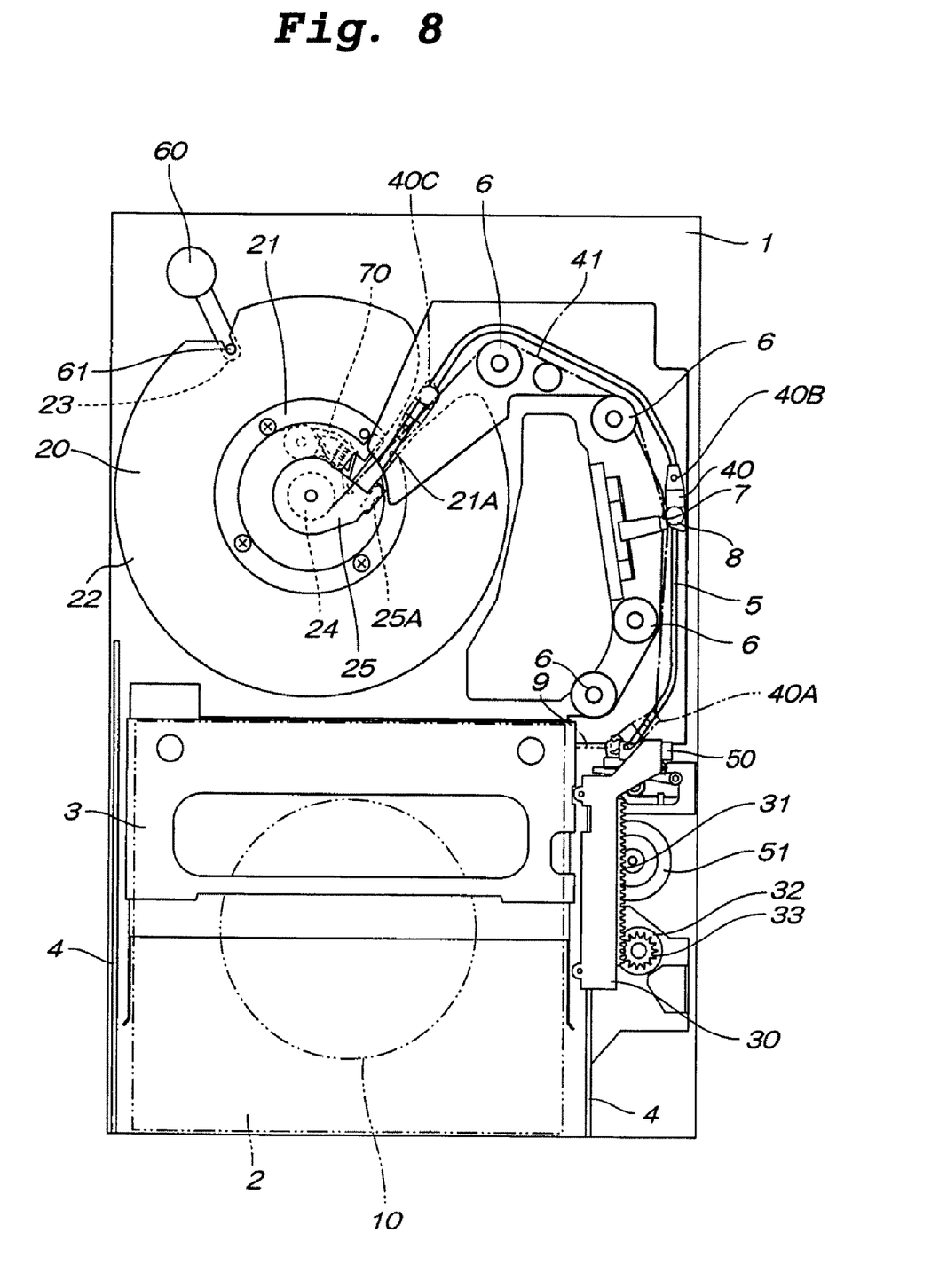
FIG. 8 is a plan view of the essential portion of the apparatus.

The reader tape 41 is reeled up around the drive shaft of the drive reel 20 by the rotation of the drive reel 20. By the reeling up motion of the reader tape 41 around the drive shaft of the drive reel 20, the tape-pulling-out element 40 is pulled by the reader tape 41. Therefore, the both ends of the turning shaft 44 of the tape-pulling-out element 40 move toward the track grooves 5 from the turning shaft recess 52, and slide in the track grooves 5. FIG. 8 shows this state.

FIG. 8 shows a state where the turning shaft 44 of a tape-pulling-out element 40A moves from the turning shaft recess 52 to the track groove 5, a tape-pulling-out element 40B moves to an intermediate portion of the track groove 5, and a tape-pulling-out element 40C moves to a location close to the reel hub 21 of the drive reel 20. By sequentially moving the tape-pulling-out element like the tape-pulling-out element 40A, the tape-pulling-out element 40B and the tape-pulling-out element 40C, the tape 9 accommodated in the tape cassette 2 can be pulled out and introduced to the reel hub 21.

Figure 9:
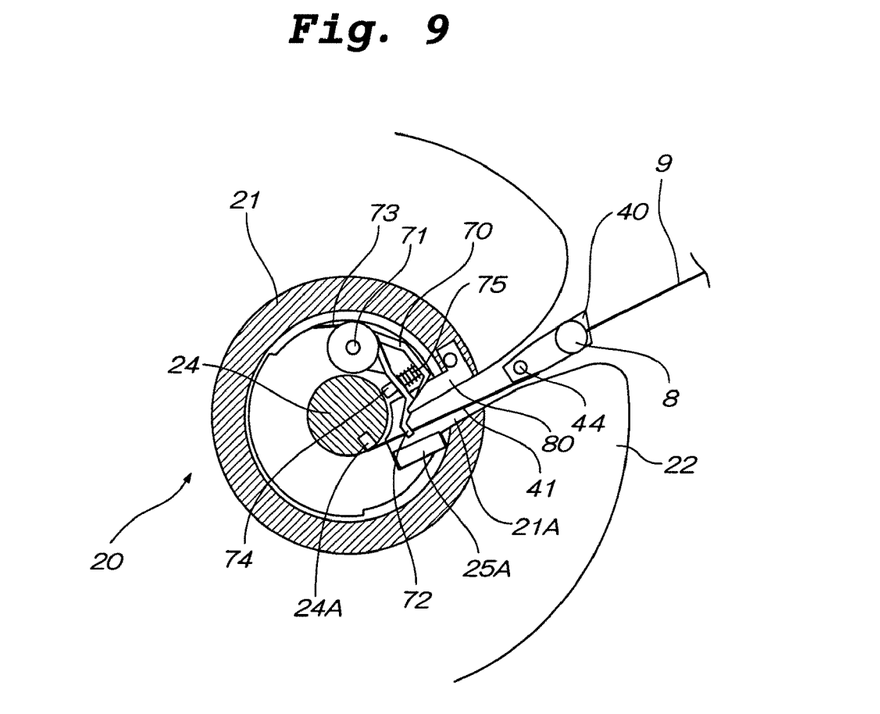
FIG. 9 is a sectional view of an upper surface showing an essential portion of a drive reel of an embodiment.
Figure 10:
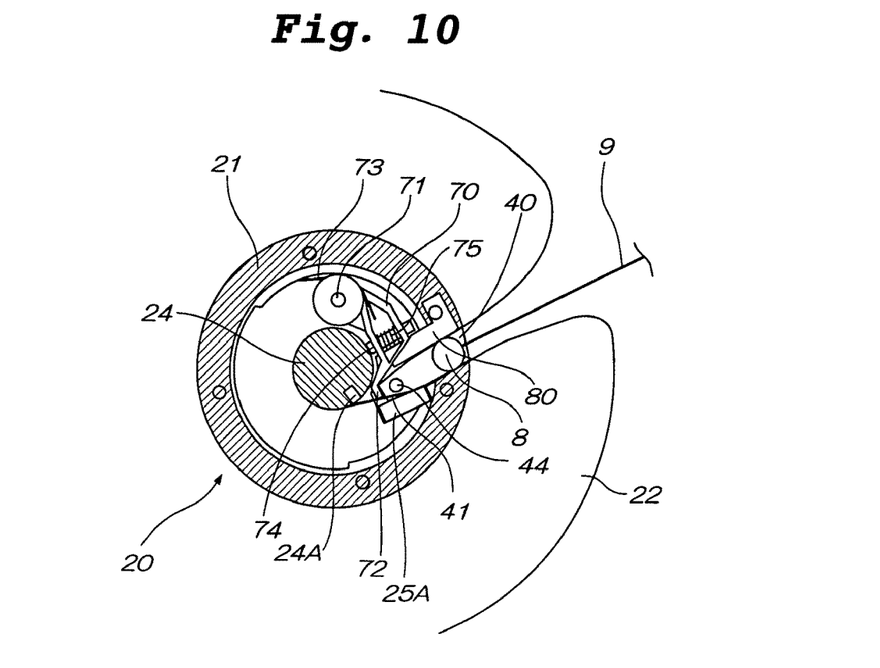
FIG. 10 is a sectional view of the upper surface showing the essential portion of the drive reel of the embodiment.
Figure 11:
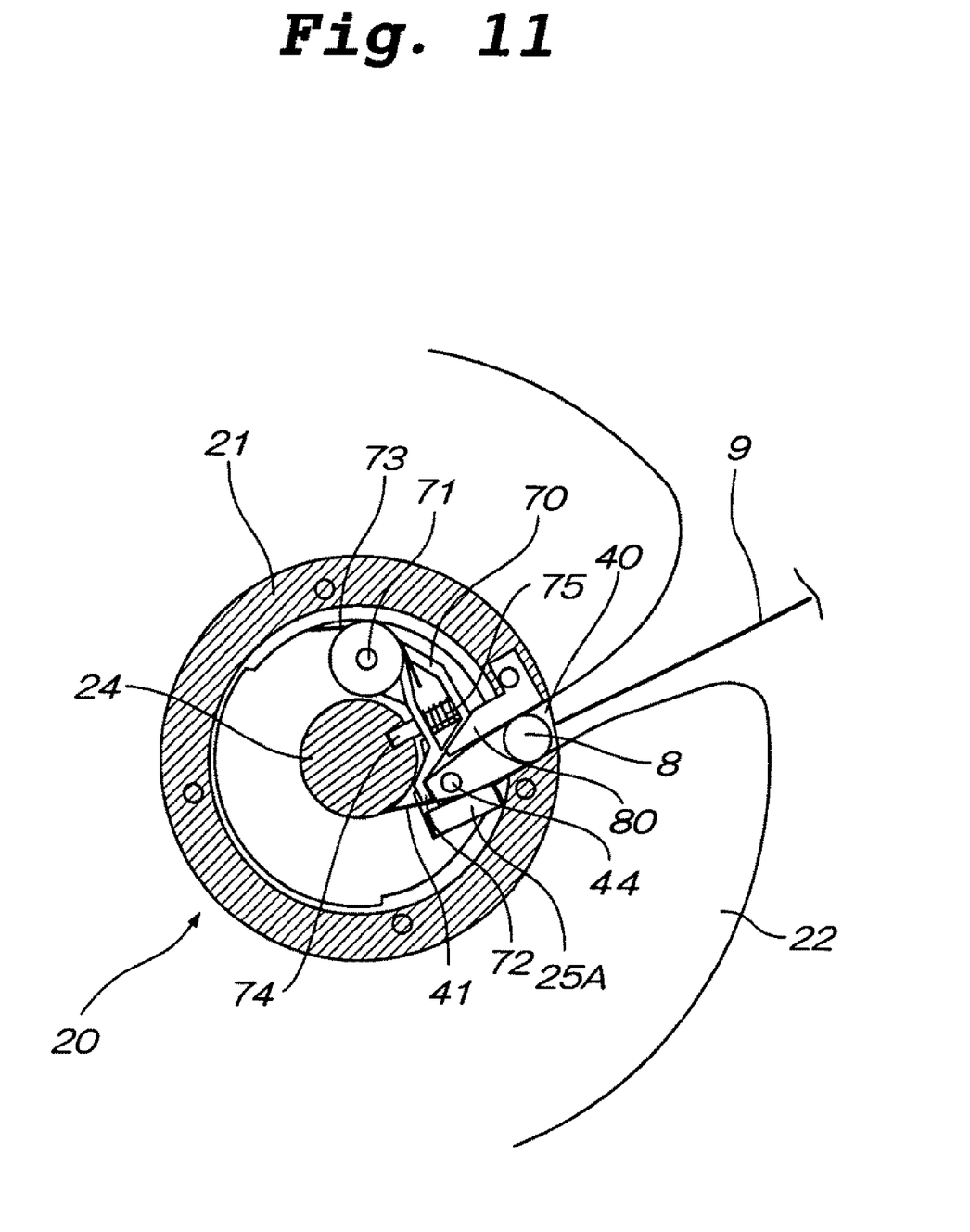
FIG. 11 is a sectional view of the upper surface showing the essential portion of the drive reel of the embodiment.

FIGS. 9 to 11 show action after the tape-pulling-out element 40 reaches the drive reel 20. FIGS. 9 to 11 are sectional views of an upper surface showing an essential portion of the drive reel 20.

Figure 12:
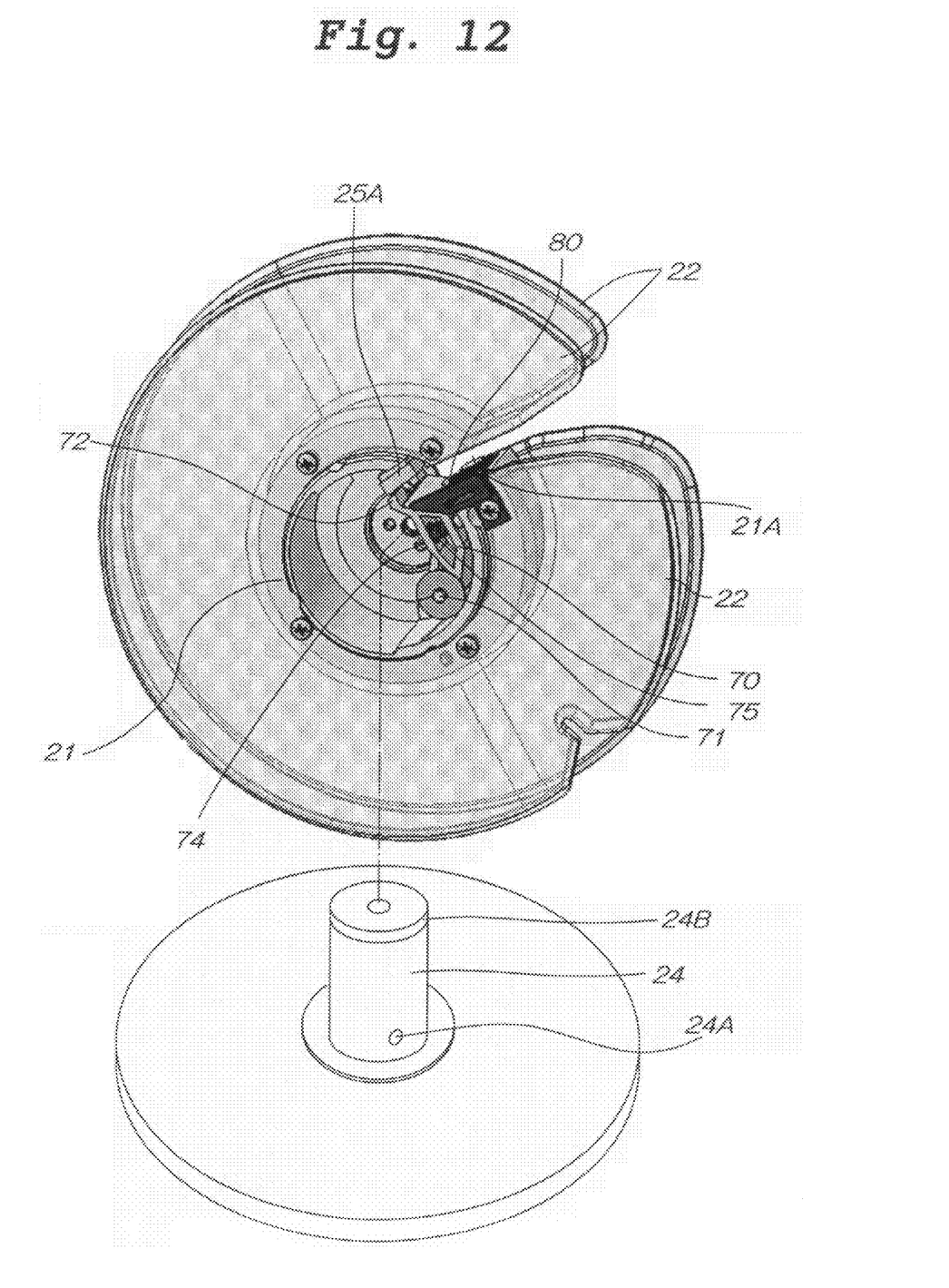
FIG. 12 is an exploded perspective view of the drive reel of the embodiment.

First, before explaining the action, a structure in the reel hub 21 will be explained using FIGS. 9 to 12. FIG. 12 is an exploded perspective view of the drive reel.

A lock member 70 is provided in a space between the drive shaft 24 and the reel hub 21.

The lock member 70 includes a lock member rotation shaft 71 provided on the reel hub 21, an element abutment portion 72 which is turned around the lock member rotation shaft 71 through a predetermined angle, a biasing member 73 which biases the element abutment portion 72 toward the hub opening 21A, and a lock pin 74 projects in the axial direction of the drive shaft 24. Here, the lock pin 74 is provided on a member main body extending from the lock member rotation shaft 71 to the element abutment portion 72, and is biased in the axial direction of the drive shaft 24 by a spring 75.

The drive shaft 24 is provided at its outer periphery with a fitting hole 24A into which the lock pin 74 can be inserted. As shown in FIG. 12, the drive shaft 24 is provided at its end with a connection shaft 24B. The connection shaft 24B is fastened to the reel hub 21. In a state where the lock pin 74 is inserted into the fitting hole 24A, the connection shaft 24B is connected to the drive shaft 24 and is rotated in unison with the drive shaft 24, but in a state where the lock pin 74 is not inserted into the fitting hole 24A, the connection with respect to the drive shaft 24 is released, and the rotation of the drive shaft 24 is not transmitted.

The hub opening 21A is provided with a positioning piece 80 which is a separate member from the reel hub 21. The tape-pulling-out element 40 is guided to a predetermined position by the positioning piece 80 and is fixed to the position. A tip end of the lock pin 74 is formed into an arc shape so that the lock pin 74 can smoothly be fitted into the fitting hole 24A.

Action after the tape-pulling-out element 40 reaches the drive reel 20 will be explained using FIGS. 9 to 11.

FIG. 9 shows a state before the tape-pulling-out element 40 reaches the hub opening 21A.

In the state shown in FIG. 9, the element abutment portion 72 is biased toward the hub opening 21A by the biasing member 73, and the lock pin 74 is separated from the drive shaft 24.

If the leader tape 41 is reeled up into the reel hub 21, the tape-pulling-out element 40 is pulled into the hub opening 21A. The tape-pulling-out element 40 which was pulled into the hub opening 21A is attracted by the magnet 25A, and the reeling up operation of the leader tape 41 is completed. This state is shown in FIG. 10.

In the state shown in FIG. 10, the element abutment portion 72 turns around the lock member rotation shaft 71 through a predetermined angle, and the element abutment portion 72 is displaced from the hub opening 21A toward the drive shaft 24. The lock pin 74 is biased toward the drive shaft 24 by the displacement of the element abutment portion 72. In this state, the tape-pulling-out element 40 closes the hub opening 21A, and a terminal end surface of the tape-pulling-out element 40, i.e., an end surface of the tape-pulling-out element 40 to which the coupling element 8 is mounted is disposed such that it is continuous with the outer peripheral surface of the reel hub 21.

The above-described action is carried out by normal rotation of the drive shaft 24.

If it is detected that the tape-pulling-out element 40 closes the hub opening 21A, the rotation of the drive shaft 24 is stopped. The lock pin 74 is inserted into the fitting hole 24A by reversely rotating the drive shaft 24 through a predetermined angle. It is preferable that the drive shaft 24 is reversely rotated in a range of rotation angle of 90 to 120°.

In the state shown in FIG. 11, the connection shaft 24B is connected to the drive shaft 24 and is rotated in unison with the drive shaft 24. As shown in FIG. 11, if the lock pin 74 is inserted into the fitting hole 24A, the rotation of the drive shaft 24 is stopped.

If the connection shaft 24B and the drive shaft 24 are connected to each other, the drive shaft 24 is connected to the reel hub 21 and the reel flange 22.

If the drive shaft 24 is connected to the reel hub 21 and the reel flange 22, the lock motor 60 is operated, and the pin 61 retreats from the flange groove 22.

With the above action, the tape threading operation is completed. By normally rotating the drive reel 20, the magnetic tape is reeled up.

According to the embodiment, if the tape-pulling-out element 40 is pulled into the hub opening 21A, the lock member 70 functions, and the drive shaft 24 and the reel hub 21 are connected to each other. Therefore, no load is applied to the leader tape 41 after the tape-pulling-out element 40 is pulled into the hub opening 21A.

According to the embodiment, the fact that the tape-pulling-out element 40 is pulled into the hub opening 21A is detected by the displacement of the element abutment portion 40 from the hub opening 21A toward the drive shaft 24. Therefore, the lock member 70 can reliably function.

According to the embodiment, since the drive shaft 24 and the reel hub 21 are connected to each other by inserting the lock pin 74 into the fitting hole 24A, the connecting operation can be carried out reliably.

According to the embodiment, the tape-pulling-out element 40 is inserted into the hub opening 21A not only by using the leader tape 41 but also by utilizing the attraction force by the magnet 25A. Therefore, the load on the leader tape 41 can be reduced, and it is possible to reliably guide the tape-pulling-out element 40 to a predetermined position.

According to the embodiment, the tape-pulling-out element 40 is introduced into the hub opening 21A by normally rotating the drive shaft 24, the lock pin 74 is biased to the drive shaft 24 by displacing the element abutment portion 72 by the tape-pulling-out element 40, and then, lock pin 74 is inserted into the fitting hole 24A by reversely rotating the drive shaft 24, and the lock pin 74 can reliably inserted into the fitting hole 24A. The drive shaft 24 and the reel hub 21 can be connected to each other reliably.

According to the embodiment, the drive shaft 24 is reversely rotated in the range of rotation angle of 90 to 120°. With this, slack of the leader tape 41 in the reel hub 21 can be reduced. Therefore, a force applied to the tape-pulling-out element 40 caused by slack of the leader tape 41 can be prevented, and it is possible to avoid a case in which the tape-pulling-out element 40 is deviated from a predetermined position.

According to the embodiment, if it is detected that the lock pin 74 is inserted into the fitting hole 24A, a lock motor 60 is driven to release a pin 61 which prevents the reel hub 21 from rotating and then, the drive shaft 24 is normally rotated, thereby normally rotating the reel hub 21 together with the drive shaft 24. Therefore, procedure can reliably be shifted to the recording and reproducing action.

According to the embodiment, a load caused by tension of the leader tape 41 is eliminated also when the magnetic tape is reeled up, and the tape reeling up operation can be carried out stably.

The magnetic recording/reproducing apparatus and the tape threading method of this invention are suitable for an apparatus such as a linear type open system, and such apparatus is especially useful as a network tape storage.

The invention claimed is:

1. A magnetic recording/reproducing apparatus in which an end of a tape accommodated in a tape cassette has a coupling element, and said coupling element is pulled out by a tape-pulling-out element and said tape is taken up around a drive reel, said magnetic recording/reproducing apparatus comprising a leader tape having one end connected to a drive shaft of said drive reel and the other end connected to said tape-pulling-out element, a reel hub which is located on an outer periphery of said drive shaft and which takes up said tape around an outer peripheral surface of said reel hub, and a lock member which connects said drive shaft and said reel hub with each other, wherein said reel hub includes a hub opening through which said leader tape passes, and said lock member is displaced by said tape-pulling-out element pulled into said hub opening and connects said drive shaft and said reel hub with each other.

2. The magnetic recording/reproducing apparatus according to claim 1, wherein said lock member includes a lock member rotation shaft provided on said reel hub, an element abutment portion which is turned around said lock member rotation shaft through a predetermined angle, and a biasing member which biases said element abutment portion toward said hub opening, and said element abutment portion is displaced from said hub opening toward said drive shaft by pulling said tape-pulling-out element into said hub opening.

3. The magnetic recording/reproducing apparatus according to claim 2, wherein said lock member includes a lock pin, said drive shaft includes a fitting hole, and said lock pin is biased towards said drive shaft by displacing said element abutment portion and then is inserted into said fitting hole.

4. The magnetic recording/reproducing apparatus according to claim 2, wherein a magnet member is disposed in the vicinity of said element abutment portion, and said tape-pulling-out element is attracted by said magnet member.

5. A tape threading method of a magnetic recording/reproducing apparatus in which an end of a tape accommodated in a tape cassette has a coupling element, said coupling element is pulled out by a tape-pulling-out element and said tape is taken up around a drive reel, said magnetic recording/reproducing apparatus comprising a leader tape having one end connected to a drive shaft of said drive reel and the other end connected to said tape-pulling-out element, a reel hub which is located on an outer periphery of said drive shaft and which takes up said tape around an outer peripheral surface of said reel hub, and a lock member which connects said drive shaft and said reel hub with each other, wherein said reel hub includes a hub opening through which said leader tape passes, said lock member includes a lock member rotation shaft provided on said reel hub, an element abutment portion which is turned around said lock member rotation shaft through a predetermined angle, a biasing member which biases said element abutment portion toward said hub opening, and a lock pin which corresponds to a fitting hole formed in said drive shaft, said tape-pulling-out element is introduced into said hub opening by normally rotating said drive shaft, said lock pin is biased toward said drive shaft by displacing said element abutment portion by said tape-pulling-out element, and then, said lock pin is inserted into said fitting hole by reversely rotating said drive shaft.

6. The tape threading method of the magnetic recording/reproducing apparatus according to claim 5, wherein said drive shaft is reversely rotated through a rotation angle range of 90 to 120°.

7. The tape threading method of the magnetic recording/reproducing apparatus according to claim 5, wherein if it is detected that said lock pin is inserted into said fitting hole, a lock motor is driven to release a pin which prevents said reel hub from rotating and then, said drive shaft is normally rotated, thereby normally rotating said reel hub together with said drive shaft.

* * * * *